No. 627,214. Patented June 20, 1899.
J. B. STEELE.
PROCESS OF AND APPARATUS FOR APPLYING INSECTICIDES.
(Application filed Aug. 16, 1898.)
(No Model.)
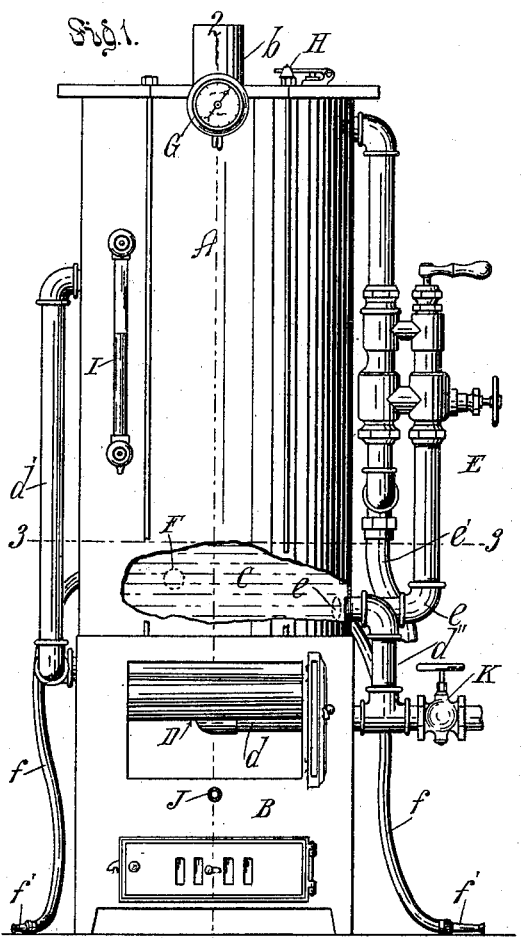
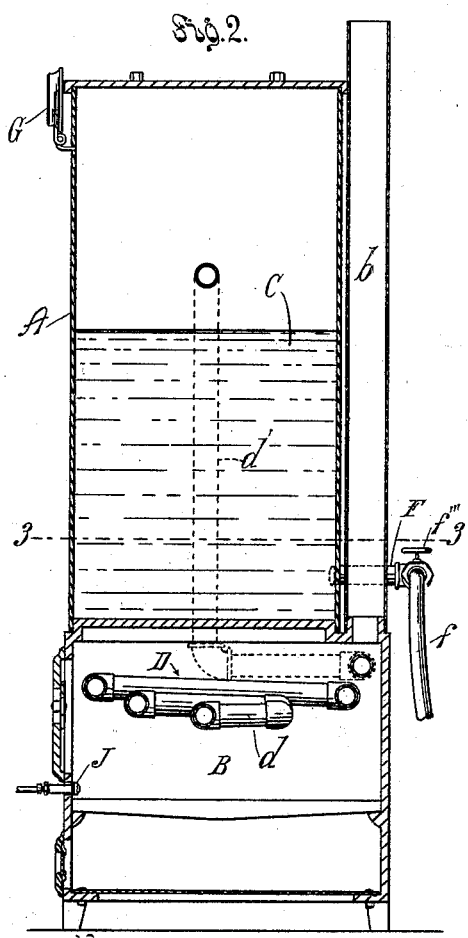
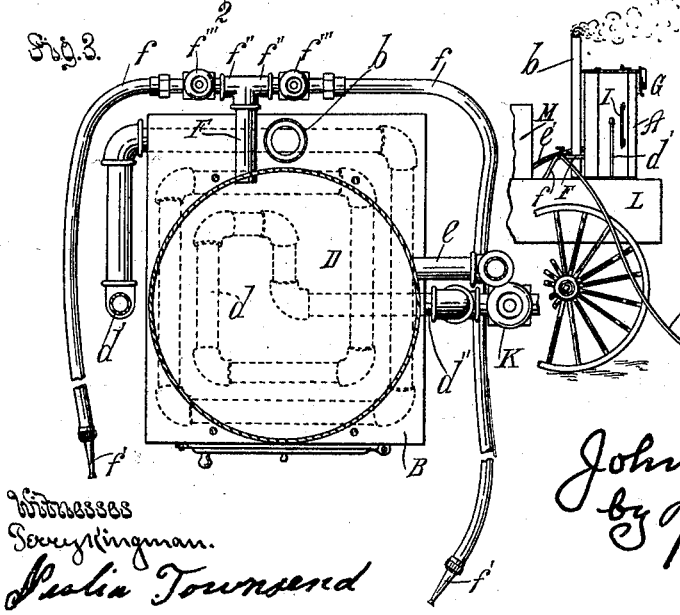

UNITED STATES PATENT OFFICE.

JOHN B. STEELE, OF NATIONAL CITY, CALIFORNIA, ASSIGNOR OF ONE-HALF TO M. C. WILLIS, OF SAME PLACE, AND WILLIAM H. REIDER, OF LOS ANGELES, CALIFORNIA.

PROCESS OF AND APPARATUS FOR APPLYING INSECTICIDES.

SPECIFICATION forming part of Letters Patent No. 627,214, dated June 20, 1899.

Application filed August 16, 1898. Serial No. 688,732. (No model.)

*To all whom it may concern:*

Be it known that I, JOHN B. STEELE, residing at National City, in the county of San Diego and State of California, have invented a new and useful Apparatus for Applying Insecticides, of which the following is a specification.

The object of my invention is to provide superior and simpler means than heretofore known for applying insecticides to destroy insects and fungus growth upon trees and other plants. I dispense with the use of any form of pump for pumping the liquid through the spraying-nozzle and apply the insecticide to the tree or plant in a thoroughly-heated state, thereby greatly enhancing the efficacy of the insecticide applied.

It is an object of my invention to take advantage of the fact that an insecticide when applied hot has a much more deadly effect upon insect life and fungus growth than when applied cold.

My method of applying the insecticide consists in heating and constantly mixing the constituents of the liquid insecticide under a pressure considerably greater than the external atmosphere and then spraying the hot liquid insecticide upon the plant to be disinfected, the principle being that the liquid is forced through a flexibly-connected spraying-nozzle by the pressure of the steam, which accumulates immediately above the liquid insecticide in a partially-filled container, and the liquid so forced, upon escaping from under a pressure greater than the atmosphere into which it is sprayed, bursts or explodes, and thus heightens the effect of the atomizer or spraying-nozzle through which it is discharged, and at the same time the atomized liquid cools sufficiently, so as not to injure the vegetable life, but remains hot enough to have the desired deadly effect upon insect life.

The temperature at which the insecticide is applied is regulated by the steam-pressure maintained in the container. At a given steam-pressure the temperature of the insecticide when sprayed will be practically uniform.
A feature of this invention is the simplicity and cheapness of the means employed. My newly-invented insecticide-spraying apparatus consists of a liquid-insecticide container, a liquid circulator and mixer for circulating and constantly mixing the materials of the charge of liquid insecticide within the container, means for heating the container and the liquid insecticide, so as to produce a steam-pressure within the container, and one or more spraying-nozzles flexibly connected with the lower part of the container for spraying the liquid insecticide by means of the direct pressure of the steam upon the liquid within the container, whereby the insecticide when liberated from the container is forced through the flexible connection and the atomizing-nozzles, thus applying the insecticide to the trees or plants at a regulated high temperature.
My spraying apparatus is of comparatively small size, for the reason that live steam is not used outside of the steam-generator to produce any steam-pressure or to do any of the work, and there is no escape of steam outside of the apparatus. The steam-pressure is maintained upon the liquid insecticide inside the container, and the liquid insecticide is forced out through the nozzles by this steam-pressure. The charge of insecticide within the container may be intermittently replenished by an injector or a force-pump; but it is to be understood that the apparatus may be used without an injector or pump, if desired, the method of use in that case being to fill the container with a charge of liquid and then raise and maintain the steam-pressure in the container until the liquid has been discharged. Then the workman will again fill the container.
Practically all the liquid can be discharged from the container by the steam-pressure.

In ordinary use for two nozzles the container may be two and one-half feet high and twelve or fifteen inches in diameter, but it is to be understood that any suitable size may be employed.

Only a comparatively small amount of fuel is required to operate this apparatus, for the reason that the pressure of steam is reduced but little by the escape of the liquid, and there is no escape of the steam from above the liquid-level. In practical use but little more heat is required than is sufficient to heat the liquid before it is sprayed and to supply the loss caused by radiation. The mechanical power expended in producing the spray is comparatively slight.

The accompanying drawings illustrate my invention.

Figure 1 is a front elevation of apparatus for carrying out my invention. Portions of the shell of the container are broken away to show the interior. Fig. 2 is a vertical section of the same on line 2 2, Fig. 1. Fig. 3 is a plan section on line 3 3, Figs. 1 and 2. Fig. 4 is a view showing the apparatus in use.

A indicates the liquid-insecticide container, which is a suitable steam-boiler, underneath which is a fire-box B, with smoke-stack $b$, preferably at the rear, extending up alongside the container.

C indicates a charge of the liquid insecticide inside the container.

D indicates in a general way the liquid heater, circulator, and mixer for circulating the liquid and mixing and heating the constituent materials of the insecticide placed within the container. More particularly this mixer and heating device consists of a heating coil or manifold $d$ and a circulating-pipe $d'$, leading from the coil or manifold $d$ in the fire-box and discharging into the upper part of the container A. The lower end of coil $d$ is connected by a pipe $d''$ with the bottom of the container A, so that the liquid will flow down through pipe $d''$ into the coil $d$, where it becomes highly heated and discharges through pipe $d'$ into the upper portion of the tank or container A.

E indicates a steam-injector for injecting the supply of cold liquid insecticide into the lower end of the container A through the pipe $e$.

$e'$ indicates the pipe through which the liquid is fed to the injector.

F indicates the pipe leading from the container to receive the flexible hose $f$, leading to the spraying-nozzle $f'$.

The pipe $d''$, which supplies the heating-coil and circulator, preferably opens from the condenser A, close to the bottom thereof, and the injector-inlet $e$ is preferably at about the same level, but slightly above the pipe $d''$, and the spraying-pipe F opens from the container close to the bottom thereof, but preferably slightly above the injector-inlet, the purpose of this arrangement being to allow the liquid which enters the container to pass through the circulating-pipe to be thoroughly heated thereby and to be discharged into the upper portion of the container before it passes out through the spraying-pipe, so that the liquid will not be discharged from the container until it has been thoroughly mixed under heat and pressure. The upwardly-extending member $d'$ of the circulating system preferably opens into the container above the liquid-level.

G indicates a steam-gage to show the steam-pressure.

H indicates a safety-valve, and I a water-glass.

The heat may be applied by means of coal, wood, oil, or other fuel.

In the drawings, J indicates an oil-burner for heating the fire-box.

K indicates a draw-cock connected with the pipe $d''$ and the lower end of the coil, so that the liquid may all be drawn off from the container and coil when desired.

In practical operation the apparatus will be mounted in a wagon L or in any suitable vehicle and will be drawn about in the orchard or field where the insecticide is to be applied. The fire being started in the fire-box and a charge of liquid being in the container, the heat of the liquid is raised until there is considerable steam-pressure in the container. The liquid will circulate through the circulating system, thus keeping the insecticide materials thoroughly and constantly mixed. Then the operator will open the valves to discharge the liquid and the steam-pressure in the upper part of the container will force the hot liquid insecticide through the pipe and nozzles. When the liquid comes to the open air, it expands and is more readily and perfectly divided by the atomizer-nozzle than it can be without my appliance.

The pipe F preferably has two or more branches $f''$, with a hose $f'$ connected to each branch and supplied with a spraying-nozzle, so that two or more operators can work at the same time, one or more on each side of the apparatus.

$f'''$ indicates valves for the hose respectively.

M indicates a barrel or tank of insecticide from which the injector is fed through pipe $e'$.

Now, having described my invention, what I claim as new, and desire to secure by Letters Patent, is—

1. An insecticide-spraying apparatus consisting of a liquid-insecticide container; a liquid circulator and mixer for circulating the materials of the insecticide within the container; means for heating the container and the liquid therein to produce a steam-pressure within the container; and one or more spraying-nozzles flexibly connected with the lower part of the container for spraying the liquid insecticide by means of the direct pressure of the steam upon the liquid within the container whereby the insecticide is applied at a regulated high temperature and by reason of expansion of the heated liquid as it is liberated through the atomizing-nozzles, it is more perfectly atomized, substantially as set forth.

2. An insecticide-spraying apparatus comprising a liquid-insecticide container; means for heating the same and generating steam-pressure therein; one or more lines of hose connected with the container below water-line and provided with spraying-nozzles; and means for supplying liquid insecticide to the container.

3. An insecticide-spraying apparatus comprising a liquid-insecticide container; means for heating the same; a hose connected with the container below the water-line and provided with a nozzle.

JOHN B. STEELE.

Witnesses:
J. A. RICE,
JOHN C. RICE.